July 10, 1945.   W. H. SCHWEBEL   2,380,336
AIRCRAFT CONSTRUCTION
Filed March 17, 1941   2 Sheets-Sheet 1
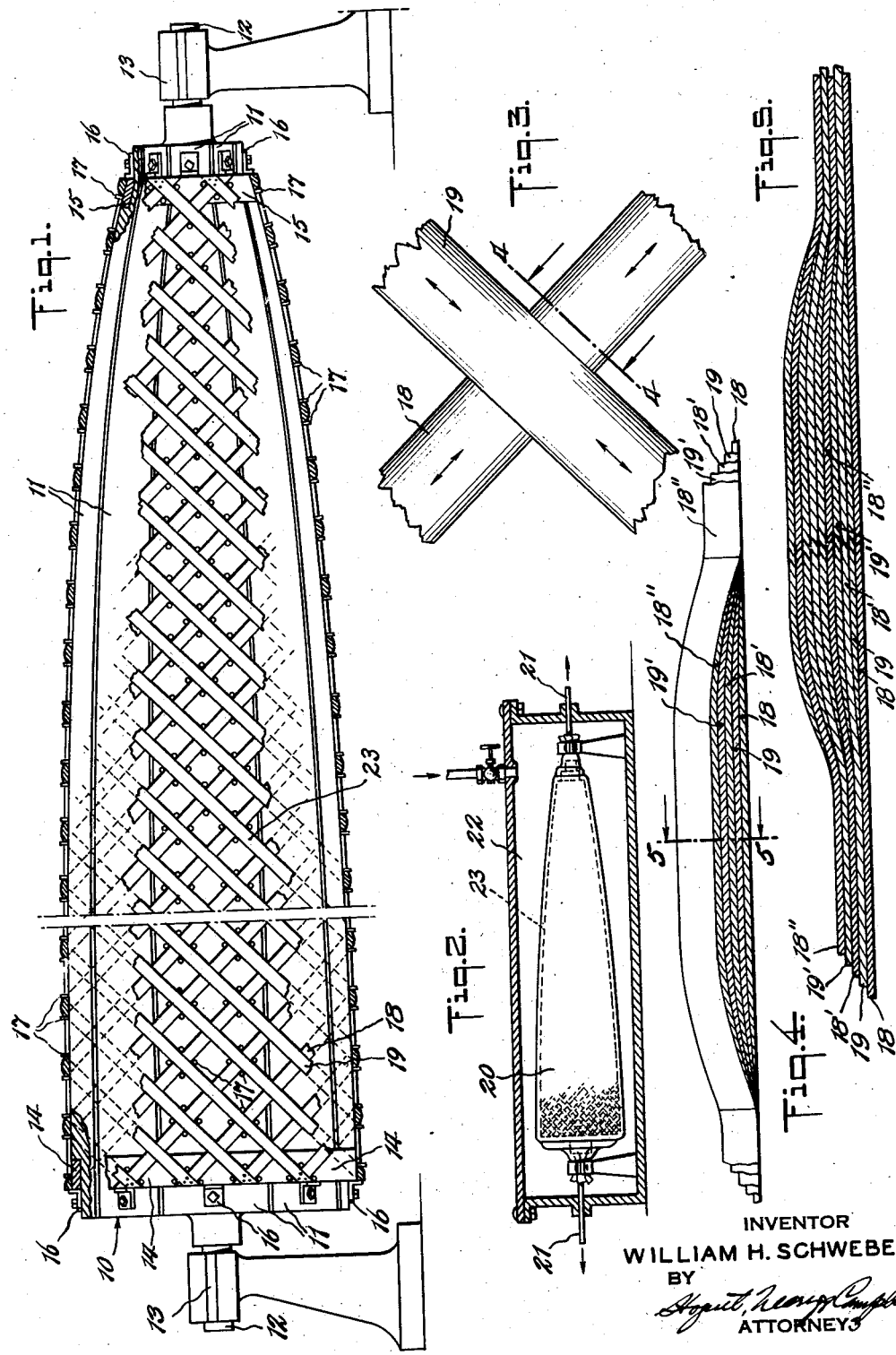
INVENTOR
WILLIAM H. SCHWEBEL
BY
ATTORNEYS

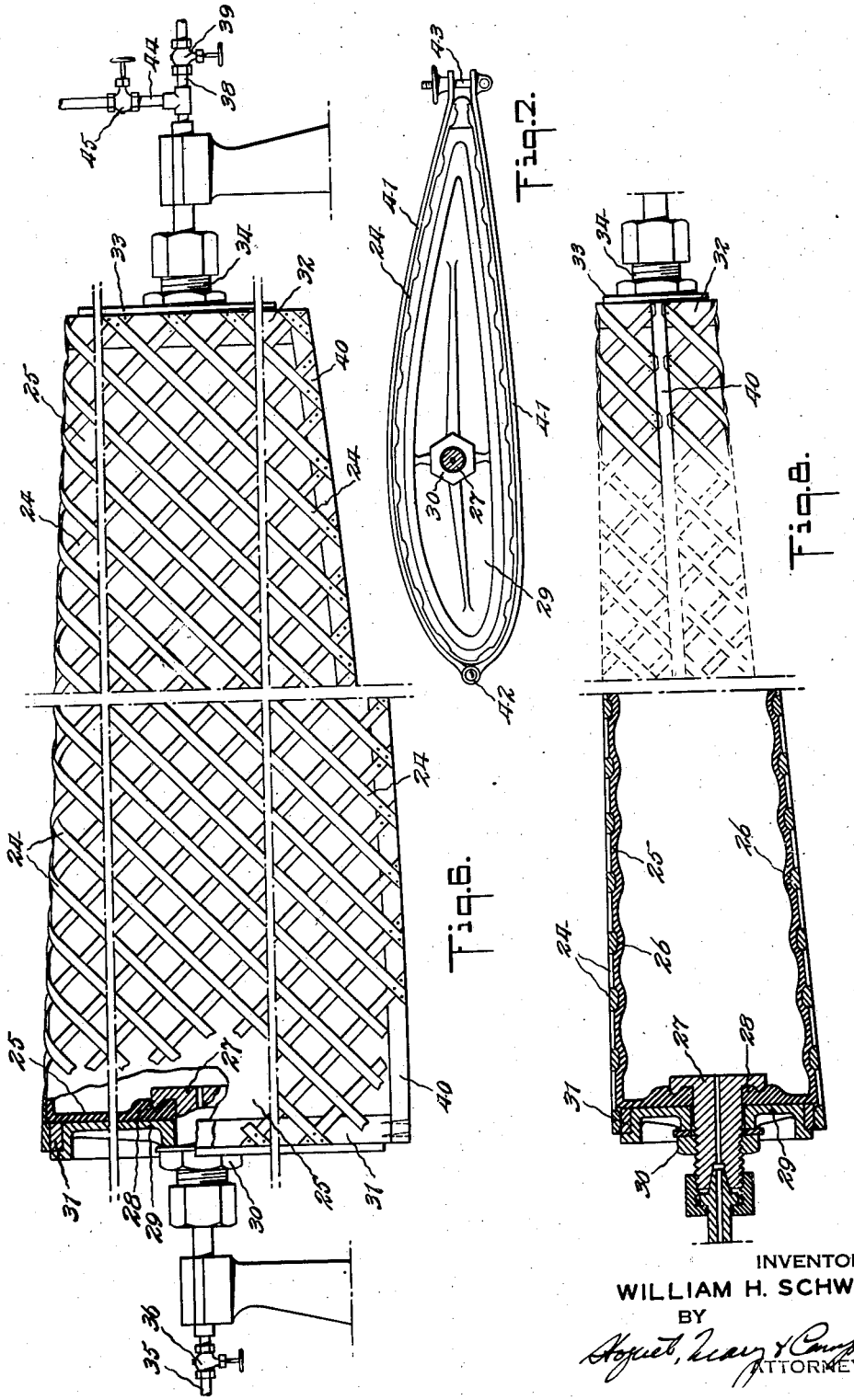

Patented July 10, 1945

2,380,336

UNITED STATES PATENT OFFICE 2,380,336

AIRCRAFT CONSTRUCTION

William H. Schwebel, Baldwin, N. Y., assignor, by mesne assignments, to William B. Scarborough, Englewood, N. J., as trustee Application March 17, 1941, Serial No. 383,782

11 Claims. (Cl. 144—309)

This invention relates to aircraft structure, and has particular reference to a geodetic type of structure for airplane fuselages, wings, and the like, although the invention is not limited to that use.

Geodetic structures for aircraft, particularly for fuselages, have proven very effective, not only by reason of their lightness and great strength, but also because they are substantially immune from damage, owing to the fact that the load-supporting members that are subject to damage form a very small proportion of the area of the structure. By way of illustration, the geodetic type of fuselage has demonstrated its substantial immunity to injury by projectiles, such as machine gun bullets, because nearly all of the exposed area of the fuselage is occupied by the openings which the bullets traverse, and the chance of striking one of the strength members is practically remote. However, as constructed at the present time, geodetic fuselages are heavy and costly and laborious to make, requiring the expenditure of an inordinate amount of time.

In accordance with the present invention, a geodetic aircraft structure, and the method of making the same are provided, whereby not only strong and essentially rigid structures can be made, but that can be done inexpensively of readily available materials in but a small fraction of the time that is required to make geodetic structures of metallic shapes joined at their junction points by riveted clips or cleats.

A preferred embodiment of the invention comprises an aircraft structure, such as a fuselage or wing section, wound of overlapping spaced strips of thin wood veneer on a mandrel or form having the shape of the finished structure. The strips are wound on the mandrel or form so that they cross at an angle, preferably 90°, to produce the characteristic geodetic shape, and alternate strips overlap each other as they are wound in directions normal to each other, until the requisite number of plies are so arranged. Interposed between the abutting surfaces of these strips is an adhesive, preferably a dry thermo-responsive adhesive, such as a thermoplastic or thermosetting synthetic resin, the latter being preferred. When the winding operation has been completed, the wood stripping, while still on the mandrel or form, is subjected to heat and pressure such that the adhesive fuses and bonds the abutting surfaces together into a unitary essentially rigid structure having the aforementioned characteristics. Then the finished structure is stripped from the mandrel or form, which for that purpose is made collapsible, and the additional necessary supporting parts, such as wing spars, bulkheads, and the like, are inserted. Either before or after the structure is bonded and stripped from the mandrel or form, a skin covering may be applied as required, such as fabric, sheet metal, wood veneer, fibre, or the like. Alternatively, this skin cover may be applied to the inner surface of the shell.

It will be seen that the geodetic structure of this invention is very inexpensive to make, according to the described method, and may be manufactured in large quantities with substantial uniformity, of readily available and inexpensive materials in a very short time.

For a more complete understanding of the invention, reference may be had to the accompanying drawings, in which:

Figure 1 illustrates the method of winding the wood strips in geodetic fashion upon a rotatable collapsible mandrel of the shape desired for the fuselage shell;

Fig. 2 illustrates an arrangement for bonding the wood strips together;

Fig. 3 is an enlarged detail of the cross strip geodetic structure;

Fig. 4 is an enlarged section therethrough, as seen along the line 4—4 of Fig. 3;

Fig. 5 is an enlarged section of Fig. 4 as seen along the line 5—5; and

Figs. 6, 7 and 8 illustrate a modified form of the method and apparatus of this invention.

Referring to Fig. 1, numeral 10 designates a mandrel having the predetermined shape of the fuselage to be formed and made of a plurality of segmental elements 11, which may be moved radially relatively to each other to collapse in the mandrel in accordance with well-known practice. This mandrel is preferably made of metal such as steel, and is light in weight. It is mounted on the shaft 12, which is journaled in trunnions 13 suitably supported on the floor so that the mandrel 10 may be rotated about its longitudinal axis.

Preferably the engine bulkhead ring 14 is first made and slipped over the mandrel so as to be properly positioned against a shoulder on the mandrel, as shown in Fig. 1. A tail bulkhead ring 15 is similarly mounted on the opposite or small end of the mandrel, and if desired, similar intermediate bulkhead rings, not shown, may be applied, although preferably they are inserted after the fuselage shell has been completed, for use in supporting wing spars, flooring, fuel tanks, equipment, and the like. These bulkhead rings 14 and 15 are preferably made of plywood sheets or strips assembled to proper thickness and then bonded together into a unitary uninterrupted ring which accordingly must be slipped over the mandrel 10 before the latter is mounted on its trunnions. However, if desired, and that may be desirable with intermediate bulkhead rings, they may be interrupted ring segments fastened together when in position on the mandrel. These rings 14 and 15 are temporarily secured to the mandrel 10 by cleats 16, or the like, which hold the bulkhead rings in place on the mandrel against rotation relatively thereto.

Rings 14 and 15 serve as nailing bases, to which the ends of the thin, flat, flexible strips or ribbons are tacked preparatory to the winding operation. These ribbons or strips are preferably formed of straight-grained wood, such as birch, spruce, mahogany, or other suitable natural material, or they may be formed of synthetic material, preferably including fibres for strength, such as textile fibres bound by phenolic resin, or so-called "fibre" and the like. These ribbon strips have the width of approximately three inches, more or less, and are scarfed or shaped along their longitudinal edges so as to taper down to a thin edge, from a maximum center thickness on the order of $\frac{1}{32}$ to $3/64$ of an inch, as is indicated in Figs. 4 and 5. These ribbons or strips should be long enough to encompass the entire mandrel from one end to the other, in order to avoid piecing during the winding operation. As wood strips are not ordinarily obtainable in that length from a single flitch, a series of strips may be bonded together by suitable adhesive, such as thermosetting adhesive of the synthetic resin type, care being taken to so arrange the joints in the strips that they, when wound on the mandrel, are not superimposed. Each strip is tacked to the engine bulkhead ring 14 and then wound diagonally around the mandrel 10, preferably at an angle of approximately 45° to the plane of the axis thereof, the mandrel meanwhile being slowly rotated by hand or power to facilitate the winding operation. Guide pins 17 projecting from the mandrel 10 and spaced apart the width of the strips and arranged in pairs in the direction in which the strip is to be wound, serve to properly guide the strips in the winding operation.

Beginning with the first layer of strips 18, each is wound spirally around the mandrel as tightly as possible, between the guide pins 17 from the engine bulkhead ring 14, to which it has been tacked, to the tail bulkhead 15, to which it is likewise tacked. This operation is repeated for each strip 18 of the fuselage until the mandrel 10 is covered with parallel strips 18 all wound in the same direction.

After the first layer of strips has been thus wound, the second layer of strips 19 is applied in the same way, but in a direction normal to the direction of the first layer of strips, so that the strips cross the strips 18 of the first layer and extend 45° to the plane of the axis of the mandrel.

The spacing between the parallel strips 18 and 19 in both directions depends upon the load that the structure is required to sustain. Thus, for a single motor pursuit airplane, for example, carrying a normal load, the spacing between adjacent strips may be on the order of four to six inches, so that the openings in the geodetic structure thus formed are approximately four to six inches square. Obviously, the spacing may be whatever is required and the angle between crossing strips need not be 90° but in any other desired angle. However, for most purposes, and because of its superior strength, a structure in which the strips are wound at right angles to each other is preferred.

Interposed between the first and second crossing layers of strips 18 and 19 is a dry thermosetting adhesive, preferably one of the synthetic resins, such as a phenolic or urea resin, which is applied to the outer or exposed surface of the strips 18 of the first layer in any suitable way. Preferably the strips are coated with a water dispersion of the resin, which is then dried, so that the outer or exposed surface of each of the first strips 18 is coated with a layer of dry resin. The strips 18 of the first layer should be so coated with adhesive but the strips of the second layer 19 should not be so coated on the under surface since they engage those of the first layer only at the point of crossing and hence if coated all over, they might adhere to the outer surface of the mandrel 10 and thus render removal of the completed shell difficult.

The third layer of strips 18' is wound in the same direction of the first layer 18, so as to cross the strips 19, and the fourth layer of strips 19' is wound in the same direction as the second layer 19 so as to cross the third layer 18', and so on until the requisite number of strips have been applied to produce the desired thickness. Thus, for ordinary purposes, such as in the case of aforementioned light plane, five or six strips may be wound in each direction so that the thickness of the strip between crossing points is on the order of a quarter of an inch, and at crossing points on the order of a half-inch, due to the double layers at that point. The guide pins 17 are extended from the mandrel 10 to a length approximately equal to the aggregate thickness of the strips at their crossing point, but the pins 17 should not extend appreciably higher because they would interfere with the bonding operation by holding the rubber bag from the strips, as will be understood.

Each of the strips following those on the second layer 19, which require no adhesive, is coated with adhesive on its lower surface, so that a bond will be formed that is coextensive with the contact of each strip with the strip next below, including the strip which crosses in the normal direction. Because the strips are scarfed to thinness along their longitudinal edges, they overlap with no abruptness at the point of crossing, as is indicated in Figs. 4 and 5, so that each rib when finished is a smooth, rounded lamina, as shown. This edge scarfing or shaping also precludes curling of the multiple-ply layer after bonding.

After the winding operation has been completed in the manner described, the entire mandrel 10 is removed from its trunnions 13 and enclosed in a rubber bag 20 which is sealed over the ends of the mandrel 10 and fitted with one or more vent pipes 21, as shown in Fig. 2. This assembly is then placed within a sealed tank 22 with the vent pipes 21 projecting therefrom, and steam under pressure and at sufficient temperature to fuse the adhesive between the strips is admitted to the chamber 22. By reason of the flexibility of the rubber bag 20, the pressure applied thereto squeezes the overlapping strips together and the heat simultaneously causes them to be bonded together. Air and steam trapped within the bag 20 is vented to atmosphere through the pipes 21. The entire bonding operation is essentially the same as that described in the patent to Potchen and Basquin, No. 2,308,453, dated January 12, 1943.

After the strips have been bonded together in the manner described, the mandrel is removed from the bag 20 and collapsed, so that the finished geodetic fuselage structure 23 may be stripped therefrom.

Either after or prior to stripping the fuselage shell 23 from the mandrel 10, or prior to the bonding operation, the strips are securely and permanently fastened to the engine bulkhead ring 14, and to the tail bulkhead ring 15, by means of metallic fasteners or by means of interposed thermosetting adhesive, or the like, depending upon requirements, the tacks which were used to temporarily fasten the strips thereto not interfering with the permanent fastening operation. When intermediate bulkhead rings are employed the strips may likewise be tacked to them as they are wound over the mandrel, and thermosetting adhesive may be interposed between the first and second layers 18 and 19 and the surfaces of the bulkheads, so that the strips are likewise bonded to the bulkheads.

As illustrated in Figs. 4 and 5, the structure thus formed is essentially homogeneous, even at the juncture of the strips, in view of the scarfing of the edges thereof, so that there are no sharp corners over which the fibres of the wood would be so sharply bent as to break or injure them. The thermosetting adhesive penetrates the wood to a substantial depth, so that the strips are securely and permanently bonded together with uniform strength over every unit of area of overlapping strips. Typical sections through the geodetic structure thus formed are illustrated in Figs. 4 and 5, which are self-explanatory. The stresses and strains are distributed substantially uniformly throughout the structure 23, those along one diagonal being transferred to the next crossing diagonal, and vice versa, as is indicated by the arrows in Fig. 3.

If desired, the geodetic fuselage shell 23 so formed, either prior to or after bonding, may have applied thereto a fabric or thin wood, fibre, or metal layer, not shown. Where fabric, wood, or fiber covering is used, it may be applied before the bonding operation, and the surfaces of outer wood strips 18" and 19' coated with thermosetting resin or other adhesive, so that the covering may be bonded thereto during and simultaneously with the final strip bonding operation within the bag 20 in the manner described. Metal covering may be applied in any suitable way, such as by utilizing fastening means, such as wire loops or metal cleats passing around the crossed points of the strips and secured to the covering. These or any other form of covering may be applied to the inner surface of the fuselage shell 23 after it has been stripped from the mandrel, or during its fabrication by covering the mandrel 10 with the covering material and building up the strips directly thereon, the lower surfaces of the strips 18 and 19 being then coated with adhesive so as to bond them to the covering during the heat treatment in the bag 20, as described. Bulkheads additional to 14 and 15 may also be secured in place within the shell 23 after it has been stripped from the mandrel for the purpose of attaching wing spars and the like.

Where it is desired to produce a geodetic structure having a smooth external surface, i. e., devoid of the surface elevations provided at the crossing points of the strips, the strips are wound in the same way, but the bonding pressure is applied from the inside against a smooth shell, so that the elevations are located on the inside surface of the structure. Apparatus for conducting this method is illustrated in Figs. 6 to 8, inclusive, which is arranged for making a geodetic wing, although the apparatus is equally adaptable to making fuselages and other parts by conforming the shape to that desired.

As shown in Fig. 6, the form on which the strips 24 are wound comprises a heavy inflatable bag 25 having the airfoil contour in chordwise cross-section and blunt root and wing tip ends. The bag 25 is preferably of rubber, either natural or synthetic, and has formed in its outer surface the grooves or channels 26 crossing each other diagonally at right angles, in which the strips are adapted to be placed and which also serve as winding guides in lieu of the pins 17 shown in Fig. 1.

A steam inlet nipple 27 is secured through the thickened root end wall 28 of the bag 25 and this nipple also cooperates with a metal clamp-plate 29 and nut 30 which hold the root bulkhead 31 in proper relation to the surfaces of the bag 25. This bulkhead 31 is preferably built up of plywood, and serves as a nailing base for the strips 24. A similar arrangement for the wing tip end of the bag 25 is provided, where the bulkhead 32 is held in position by plate 33 on the air inlet and outlet nipple 34. The false rear spar 40, also of wood veneer, is held in place by securing it to the rear ends of bulkheads 31 and 32, as by wood screws, and also serves as a nailing base for the strips 24. A steam supply pipe 35 controlled by normally-closed valve 36 is connected to nipple 27 and an air-supply pipe 38 controlled by valve 39 is connected to nipple 34. A small purging bypass pipe 44 and valve 45 are provided in air pipe 38.

In utilizing the apparatus shown in Figs. 6 to 8, the bulkheads 31 and 32 and the false spar 40 are positioned as described, and with steam valve 36 closed, air under pressure is admitted to the interior of bag 25 to cause the surface thereof to be firm during winding. Only a few pounds of pressure, such as ten to fifteen pounds gage are needed, as the bag 25 should not bulge out of shape. Then the air valve 39 is closed and the strip winding operation proceeds as before except that the strips 24 are laid with their flat surfaces uppermost, and the synthetic resin adhesive is provided on the upper or outer surface of the strips of the first or lowermost layer and on the under surfaces of the strips of the layers following the second layer, which requires no adhesive on either surface. Alternatively, sheets of adhesive may be laid between the several layers of strips 24. The strips 24 as wound are tacked to the bulkheads 31 and 32 and to spar 40.

After the requisite number of layers of strips 24 have been wound in the grooves 26 of the rubber bag 25, a rigid sheet metal die 41 is placed around the whole assembly, this die having the exact contour desired for the finished structure and having a smooth interior surface. As shown in Fig. 7, the die 41 may be conveniently made in two sections hinged together at 42 and clamped in place by hinged bolts 43.

Heat and pressure are then applied to this strip assembly by opening steam valve 36. Immediately thereafter air purge valve 45 is opened to let out the air, and this valve is left open until steam begins to issue from pipe 44. In this way sufficient steam pressure is built up to preclude collapse of the bag 25 and consequent possible disarrangement of the strips while the air is being let out. With valve 45 shut, the steam pressure continues to build up to cause bag 25 to force the strips against the smooth shell 41, so that by the time the apparatus is heated sufficiently to cause the thermo-responsive adhesive to soften, the strips 25 are in the proper bonding relation shown in Figs. 4 and 5, except inverted, the flat surface being directed outwardly.

After the adhesive has performed its bonding function, steam valve 36 is closed and valve 45 reopened to purge the steam from the bag 25, thus relieving the pressure on the die 41, which may then be opened. The collapsed bag 25 is withdrawn through the opening in the root bulkhead 31, after the plates 29 and 33 are removed and the pipes 35 and 38 uncoupled from respective nipples 27 and 34. The finished geodetic wing structure remains, which may then be fitted with additional chordwise bulkheads if desired, with a spanwise spar or spars, and with a metallic, fabric, fibre, or plywood skin covering.

The skin may be applied by overlaying the form therewith after the winding of the strips 24 has been completed. Where fabric, fibre, or plywood is used, the outer or flat surfaces of the strips of the first two layers are coated with the adhesive resin and the covering laid thereover before the die shell 41 is applied. The heat and pressure will then simultaneously bond the covering and strips together.

Although the invention has been illustrated and described in connection with the making of a fuselage and wing shells of the novel geodetic construction described, it is to be understood that the invention is not limited thereto but is equally applicable to the manufacture of other parts by winding molds or forms with the overlapping and crossing strips in the manner described and bonding them together. Also, the invention is not limited to the particular structure and mode of manufacture thereof described herein except as limited by the scope of the appended claims.

I claim:

1. The method of fabricating a structural assembly, which comprises, superimposing thin strips of material to form bands arranged in sets of spaced bands; laying the strips of bands of one set in a direction intersecting the bands of another set; superimposing at intersections the strips of one band alternately with the strips of the respective intersecting band; flexing the several strips of each band into surface to surface engagement with each other between intersections; attaching surface to surface the intersecting strips of intersecting bands at intersections; attaching surface to surface the strips in each band between intersections; forming the several bands to a predetermined surface contour on one side of the assembly, and on the opposite side of the assembly forming them to a surface contour which is irregular in accordance with the degree of flexing of strips between intersections.

2. The method of fabricating a structural assembly of molded wood, which comprises, superimposing thin strips of wood to form bands arranged in sets of spaced bands; laying the strips of bands of one set in a direction to intersect the bands of another set; superimposing at intersections the strips of one band alternately with the strips of the respective intersecting band; flexing the several strips of each band into surface to surface engagement with each other between intersections, forming the several bands to a predetermined surface contour on one side of the assembly, and on the opposite side of the assembly forming them to a surface contour which is irregular in accordance with the degree of flexing of strips between intersections; attaching surface to surface the intersecting strips of intersecting bands at intersections; and attaching surface to surface the strips in each band between intersections.

3. The method of fabricating a structural assembly of molded material which comprises, superimposing on a body of predetermined contour strips of the material to form intersecting bands; superimposing at intersections the strips of one band alternately with the respective strips of the intersecting band; pressing the bands against said body to force into surface to surface engagement the strips of each band between intersections, to force into surface to surface engagement with one another the intersecting strips of intersecting bands at intersections and to flex the bands into conformity with the contour of said body; and adhering together the several engaged surfaces.

4. The method of fabricating a structural assembly which comprises, superimposing a plurality of thin strips of material to form bands; laying the strips of one or more bands in a direction to intersect one or more other bands; superimposing at intersections the strips of one band alternately with the strips of the respective intersecting band; placing a rigid mold having a contour corresponding to the desired contour of the finished assembly on one side of the intersecting bands; applying pressure to the opposite side of the intersecting bands against the mold to force into surface to surface engagement the strips of each band between intersections, to force into surface to surface engagement with one another the intersecting strips of intersecting bands at intersections, and to flex the several bands against the rigid mold; and adhering together the several strips along the engaged surfaces.

5. The method of fabricating a structural assembly of molded wood which comprises, superimposing on an inflatable hollow member a plurality of thin strips of wood to form bands; laying the strips of one or more bands in a direction to intersect one or more other bands; superimposing at intersections the strips of one band alternately with the strips of the respective intersecting band; placing a rigid forming mold over the laid strips; inflating the inflatable member to apply pressure to the assembly against the mold to force into surface to surface engagement the strips of each band between intersections, to force into surface to surface engagement with one another the intersecting strips of intersecting bands at intersections, and to flex the several bands against the rigid mold; and adhering together the several strips along the engaged surfaces.

6. The method of fabricating a structural assembly consisting of bands and a spar member, the method comprising, superimposing a plurality of thin strips of material to form bands arranged in sets of spaced bands; laying the strips of bands of one set in a direction intersecting the bands of another set; superimposing at intersections the strips of one band alternately with the strips of the respective intersecting band; attaching the ends of the several bands to the spar member; flexing the several strips of each band into surface to surface engagement with each other between intersection; attaching surface to surface the intersecting strips of intersecting bands at intersections; attaching surface to surface the strips in each band between intersections; and forming the several bands to a predetermined contour on one side of the assembly, the contour on the opposite side of the assembly being irregular and determined by the total thickness of the superimposed strips at each particular point.

7. A structural assembly, comprising a set of spaced bands intersecting a second set of spaced bands, each band of each set comprising a plurality of superimposed strips, the structure of each intersection comprising strips of the respective intersecting bands alternately superimposed, the strips of intersecting bands at intersections, and the strips in individual bands between intersections, being attached together in surface to surface engagement with each other, the several bands being formed to constitute portions of a smooth predetermined surface contour on one side of the assembly, the bands forming an irregular surface contour on the opposite side of the assembly determined by the total thickness of the superimposed strips at each particular point.

8. A structural assembly of molded wood, comprising a set of spaced bands intersecting a second set of spaced bands, each band of each set comprising a plurality of superimposed strips, the several strips having their longitudinal edges feathered, the structure of each intersection comprising strips of the respective intersecting bands alternately superimposed, the strips of intersecting bands at intersections, and the strips in individual bands between intersections, being adhered together in surface to surface engagement with each other, the several bands being joined to constitute portions of a smooth predetermined surface contour on one side of the assembly, the bands forming an irregular surface contour on the opposite side of the assembly determined by the total thickness of the superimposed strips at each particular point.

9. An airplane wing construction of molded wood comprising, a spar member disposed longitudinally of the wing structure; and a plurality of bands arranged in sets of spaced bands, a first set of spaced bands intersecting a second set of spaced bands at intersections, the bands being attached to and terminating at the spar member, each band of each set comprising a plurality of superimposed strips, the structure of each intersection comprising strips of the respective intersecting bands alternately superimposed, the strips of intersecting bands at intersections, and the strips in individual bands between intersections, being adhered together in surface to surface engagement with each other, the several bands being formed to constitute portions of a smooth predetermined surface contour on one side of the assembly, the bands forming an irregular surface contour on the opposite side of the assembly determined by the total thickness of the superimposed strips at each particular point.

10. An airplane wing construction of molded wood comprising a spar member disposed longitudinally of the wing structure; a bulkhead at each end of the spar member; and a plurality of bands arranged in sets of spaced bands, a first set of spaced bands intersecting a second set of spaced bands, some bands being attached to and terminating at the spar member, remaining bands being attached to and terminating at a bulkhead, each band of each set comprising a plurality of superimposed strips, the structure of each intersection comprising strips of the respective intersecting bands alternately superimposed, the strips of intersecting bands at intersections, and the strips in individual bands between intersections, being adhered together in surface to surface engagement with each other, the several bands being formed to constitute portions of a smooth predetermined surface contour on one side of the assembly, the bands forming an irregular surface contour on the opposite side of the assembly determined by the total thickness of the superimposed strips at each particular point.

11. The method of fabricating a structural assembly which comprises, superimposing thin strips of material to form bands, laying the strips of one or more bands in directions to intersect one or more other bands; superimposing at intersections strips of one band alternately with strips of the intersecting band, flexing the several strips of each band into surface to surface engagement with each other between intersections of bands, attaching the strips of intersecting bands at intersections, and the strips of each band between intersections, into surface to surface engagement, forming the several bands to a predetermined surface contour on one side of the assembly, and on the opposite side of the assembly forming them to a surface contour which is irregular and determined by the total thickness of the superimposed strips at each particular point.

WILLIAM H. SCHWEBEL.